July 9, 1929.  S. HUNT  1,720,552

MACHINE FOR THE MANUFACTURE OF GLASS ARTICLES

Filed Sept. 3, 1927

INVENTOR
SYDNEY HUNT,
BY
Baldwin Wight
his ATTORNEYs

Patented July 9, 1929.

1,720,552

UNITED STATES PATENT OFFICE.

SYDNEY HUNT, OF BIRMINGHAM, ENGLAND.

MACHINE FOR THE MANUFACTURE OF GLASS ARTICLES.

Application filed September 3, 1927, Serial No. 217,441, and in Great Britain June 22, 1927.

This invention relates to machines for the manufacture of glass articles, and refers more particularly to that type of such machines in which a parison mould is lowered to a tank or its equivalent containing molten glass, in order to pick up a charge of glass for the manufacture of bottles or the like, by blowing or other suitable means.

With machines of this description it is necessary to provide a knife for cutting off the trailing glass from the bottom of the parison or equivalent mould when it rises from the tank or pot containing the molten glass.

It is further desirable so to arrange the mechanism that the knife shall not be in contact with the bottom of the parison or equivalent mould at the return stroke, in order to prevent the production of a scar or the like at the bottom of a finished glass article.

According to the present invention, in order to effect this object, a stop is provided which is adapted to arrest the upward movement of the parison mould or the mechanism carrying the same, in a position intermediate between its lowermost position, when it takes up the glass, and its uppermost position, and in this intermediate position, the knife for cutting off the trailing glass is brought into operation, the stop forming a device for withstanding the upward thrust of the knife as it shears through the trailing glass. After the knife has been brought into operation and at a desired time the stop is removed and the parison mould is left free to rise or to be raised into its uppermost position, thus removing the bottom of the parison from the knife.

In order that the invention may be more clearly understood, it will now be described with reference to the accompanying drawings where it is shewn applied to a machine for the manufacture of glass articles, in which the parison mould is controlled by a mechanism including a counterbalance weight, such mechanism being operated at appropriate times to lower the parison mould into the dipping position.

In the accompanying drawings:—

Fig. 1 is a fragmentary diagrammatic view illustrating the application of the invention.

Fig. 2 shews a fragmentary sectional elevation of a preferred construction of the stop mechanism.

Figure 1:
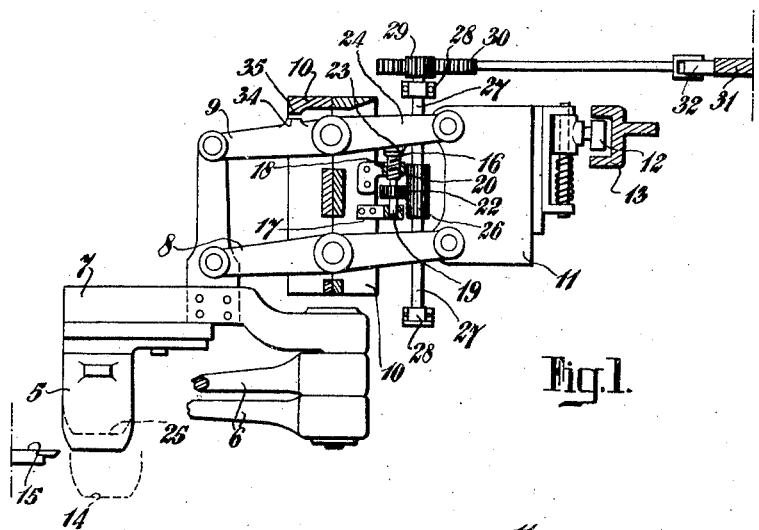

In the drawings, 5 is the parison mould and 6 the arms therefor shewn broken away. These are carried by the blowing head 7 which is supported by parallel levers 8 and 9 fulcrumed in an adjustable slide 10 and connected at their other ends to a counterbalance weight 11 carrying in a resilient manner a cam roller or follower 12 which cooperates with a cam 13 attached to a fixed central column (not shewn). In addition the parison mould 5 and associated parts are carried by a rotary framework which rotates around the fixed central column.

All the above mechanism is of a known type and the cam 13 through the lever mechanism causes the parison mould 5 at appropriate times to be lowered into the dipping position and after taking up a charge of glass to be raised.

In carrying the invention into effect, as applied to a machine of the foregoing type, a stop is provided for limiting the movement of one of the arms of the lever or levers which are provided for controlling the upward movement of the parison mould. This stop may be adapted for intercepting the rise of the parison mould 5 in an intermediate position, that is the cutting off position which is shewn in full lines in Fig. 1 for a desired period, after which period the stop is removed and the lever or levers are enabled to raise the parison mould to the uppermost position, out of contact with the knife 15, the raising being effected either by means of counterbalance weights, a cam, by a combination of such means or otherwise, for example as shewn in the drawings.

Where lever mechanism is utilized for raising and lowering the parison mould, the stop may be applied beneath one of the lever arms between the fulcrum and the central column or equivalent part of the machane; or, if found more convenient above one of the lever arms on the side of the fulcrum remote from the central column of the machine.

In the preferred construction, and as shewn on the drawings, the stop 16 for controlling the upward movement of the parison mould 5 is arranged as follows.

Mounted upon the slide 10 carrying the pivoted levers 8 and 9 are brackets 17 and 18 for a vertical spindle 19. The upper bearing bracket 18 is provided with an internal thread of sudden pitch and a portion 20 of the vertical spindle which passes through this bracket is provided with a corresponding external thread. The lower end of the spindle 19 is free to slide in the lower bearing bracket 17 and the upper end of the spindle is formed with or has attached thereto a suitable stop 16, for example the upper end of the spindle may carry a ball thrust or other bearing 21. Between the two bearing brackets 17 and 18 on the spindle 19 a toothed pinion 22 is mounted.

Figure 2:
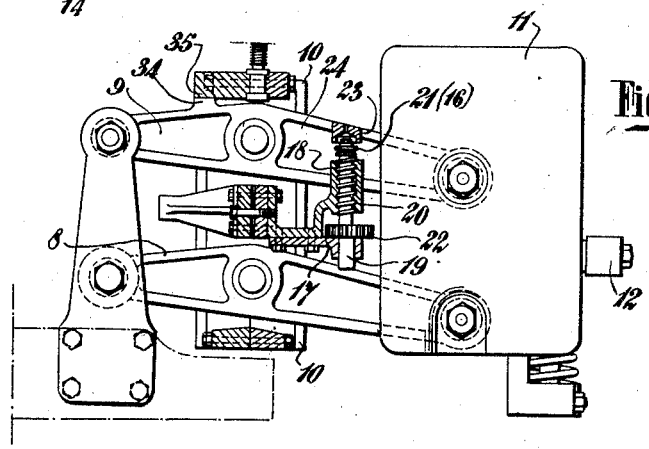
Figures 3, 4:
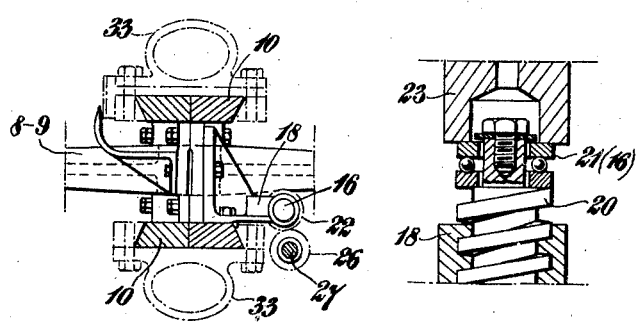
Fig. 3 is a sectional plan of a portion of Fig. 2.
Fig. 4 is an enlarged detail shewing the preferred construction of the stop.

The upper end of the spindle carrying the ball thrust or other bearing 21 comes beneath a suitably formed abutment 23 or machined surface on the underside of one arm 24 of the lever mechanism controlling the parison mould 5. When the spindle 19 is rotated from its pinion 22, in one direction, the stop 16 on the upper end thereof is brought to its uppermost position which is the position shewn in Fig. 1, and in this position the co-operating abutment on the underside of the lever arm 24 comes against the stop 16, when the lever arm 24 is moving downwards and prevents the rise of the parison mould beyond this point. When the spindle 19 is rotated from its pinion 22 in the opposite direction the stop 16 at the upper end of the spindle 19 is lowered into the position shewn in Fig. 2 and as a consequence the lever arm 24 coming above the stop can move downwards. This results in the rise of the parison mould to its uppermost position, shewn dotted at 25, Fig. 1.

The pinion 22 on the spindle 19 is in mesh with a long pinion 26 mounted upon a vertical shaft 27 carried by suitable bearings 28 in the rotary framework. The upper end of this vertical shaft 27 has mounted thereon a pinion 29 with which a sliding rack 30 meshes. The movements of the rack 30 are controlled by any suitable means so that the rack is periodically reciprocated and when moved in one direction the pinion 22 on the spindle 19 of the stop 16 is caused to rotate in one direction for example to raise the stop, and when moved in the other direction the said pinion is caused to rotate in the opposite direction to lower the stop. This pinion is in constant mesh with the long pinion 26 during its upward and downward movements.

The movements of the rack 30 are controlled by any suitable mechanism, for example, in a rotary bottle making machine comprising a number of units rotating around the fixed central column, a suitable cam 31 is attached to the central column (not shewn), co-operating with the follower mechanism 32, and this follower mechanism controls the rack, either directly through a suitable rod or through suitable intermediate transmission mechanism which may include levers.

Where the fulcrum of the lever mechanism carrying the parison or like mould is vertically adjustable—for example by adjusting the slide 10 in any desired vertical position between the parts 33 of a bifurcated column forming part of the rotary framework—the stop mechanism hereinbefore described automatically adapts itself to the varying positions of the fulcrum of the lever, owing to the fact that the pinion 22 controlling the stop 16 remains in mesh with the long pinion 26 on the vertical shaft 27 in all positions.

In some instances, in order to vary the position in the rotation of the machine at which the parison or equivalent mould 5 is raised from the knife 15, the circumferential extent of the cam 31 in connection with the fixed column or the position of the operative part may be varied.

The operation of the stop mechanism according to the invention will be readily understood:—

When the cam 13 has raised the weight 11 and caused the parison mould 5 to be dipped to its lowermost position 14 into the glass tank to draw up a charge of glass and in the rotation of the machine has caused the parison mould again to be raised, the arrangement of the cam 31 and mechanism controlled thereby is such that the stop 16 is brought to its uppermost position. This has the effect of preventing the parison mould 5 from being moved to its uppermost position and causes the abutment 23 to come on the stop 16 and hold the parison mould in the full line position shewn in Fig. 1. The knife 15 is now brought into position by the rotation of its shaft (not shewn) to come beneath the parison mould to cut off the trailing glass, the upward pressure of the knife being taken by the stop 16. The knife remains beneath the parison mould until the cam follower 32 comes to the end of the cam 31 or to an appropriate part of the cam 31 which causes the stop 16 to be moved to its lower position. This permits the weight 11 to move downwards raising the parison mould from the knife 15; the knife 15 is now free to be returned and as the parison mould has been raised away from the knife it will be seen that the return movement of the knife does not produce a scar or the like on the bottom of the glass in the parison mould. The parison mould, when the stop 16 is moved to its lowermost position (Fig. 2), comes to its uppermost position 25, this position being defined by co-operating stops 34 and 35 on the uppermost lever 9 and the adjustable frame 10 respectively. In this position, as will be seen from Fig. 2, the stop 16 comes some distance below and out of contact with the abutment 23.

Although the present invention has been described in connection with a machine for the manufacture of glass articles, in which the parison or equivalent mould is raised by lever mechanism, it is to be understood that it is applicable to machines in which the raising is effected by slides carrying the parison mould raised directly or indirectly by lever mechanism, and to other machines for which it may be suitable.

Having now particularly described and ascertained the nature of my said invention and in what manner the same is to be performed, I declare that what I claim is:—

1. In machines for the manufacture of glass articles having a parison mould adapted to be lowered to a receptacle containing molten glass in order to pick up a charge of glass and then to be raised therefrom; and having a knife adapted to cut off the trailing glass from the bottom of the parison mould, when this latter is raised; a construction including a movable stop which is adapted to arrest the rise of the parison mould in an intermediate position and to form a reaction abutment to take the upward thrust of the knife during the cutting, together with means for removing the stop after such cutting, for the purposes set forth.

2. In machines for the manufacture of glass articles having stop mechanism for arresting the rise of the parison mould in an intermediate position, as claimed in claim 1, a construction including an element adapted to project into the path of a part controlling the rise of the parison mould, with cooperating screw means for bringing the said element into a position for arresting the rise of the mould in the intermediate position, preparatory to cutting, and for subsequently removing it, in order to allow the free rise of the mould away from the knife after cutting.

3. In a machine of the class described for the manufacture of glass articles, and of the kind in which the parison mould is lowered and raised by means of a pivoted lever carried by a framework, and having stop mechanism for arresting the rise of the parison mould in an intermediate position; a construction including an internally screw threaded member carried from the fixed framework and in fixed relation therewith, a spindle having a screw threaded portion screwing through the said internally screw threaded member, the said spindle carrying a stop adapted to project into the path of a part moving with the lever, and means for alternately rotating this spindle in opposite directions, in order to bring the stop into and out of action, for the purposes set forth.

4. In a machine for the manufacture of glass articles and provided with mechanism as claimed in claim 3, a construction including a pinion mounted on the spindle carrying the stop, a shaft carried by the relatively fixed framework, a long pinion on said shaft meshing with the pinion on the spindle, a second pinion on the said shaft, a rack meshing with the last mentioned pinion, and means for reciprocating the said rack during the operation of the machine, for the purposes set forth.

5. In machines for the manufacture of glass articles having a parison mould adapted to be lowered to a receptacle containing molten glass, in order to pick up a charge of glass, and then to be raised therefrom; and having a knife adapted to cut off the trailing glass from the bottom of the parison mould, when the latter is raised; a construction including a movable stop which is adapted to arrest the rise of the parison mould in an intermediate position and to form a reaction abutment to take the upward thrust of the knife during the cutting, together with means for removing the stop after such cutting and means for varying the time at which the said stop is removed all for the purposes set forth.

6. In machines for the manufacture of glass articles having a parison mould adapted to be lowered to a receptacle containing molten glass in order to pick up a charge of glass and then to be raised therefrom; and having a knife adapted to cut off the trailing glass from the bottom of the parison mould, when this latter is raised; a construction including a movable stop which is adapted to stop the rise of the parison mould in an intermediate position and to form a reaction abutment to take the upward thrust of the knife during the cutting, means for bringing the stop into position before cutting and for removing it after cutting, the said means being controlled from a cam, and means for varying the operative part of the cam in order to vary the position at which the stop is operated, all for the purposes set forth.

7. In a machine for the manufacture of glass articles, the combination of a mould adapted to be moved vertically into and out of receptacle containing molten glass, a movable knife for cutting off the molten glass from the bottom of said mould, means for moving the mould vertically and actuating the knife including a movable stop for arresting the rise of the mould in an intermediate position during the cutting action of the knife, and means for moving the stop to ineffective position subsequent to the knife cutting action.

In witness whereof I affix my signature.

SYDNEY HUNT.